United States Patent [19]

Adams et al.

[11] Patent Number: 5,593,129
[45] Date of Patent: *Jan. 14, 1997

[54] TELESCOPING MAST WITH IMPROVED HOLDDOWN-LOCKING MECHANISM

[75] Inventors: Daniel S. Adams, Visalia; Gene R. Butler, Kingsburg; Kenneth J. Pereira, Hanford, all of Calif.

[73] Assignee: Tri-Ex Tower Corporation, Visalia, Calif.

[ * ] Notice: The term of this patent shall not extend beyond the expiration date of Pat. No. 5,163,650.

[21] Appl. No.: 72,817

[22] Filed: Jun. 7, 1993

Related U.S. Application Data

[63] Continuation-in-part of Ser. No. 772,167, filed as PCT/US92/08721, Oct. 6, 1992, Pat. No. 5,163,650.

[51] Int. Cl.$^6$ .............................. E04H 12/00; F16B 7/00
[52] U.S. Cl. ...................... 248/405; 248/354.5; 343/883
[58] Field of Search ................... 248/405, 354.4, 248/354.3, 406.1, 411, 422, 188.5, 334.1, 333, 335; 343/883, 878, 880, 901; 52/67, 105, 118, 117; 182/141

[56] References Cited

U.S. PATENT DOCUMENTS

| 388,491 | 8/1888 | Hill | 182/232 |
|---|---|---|---|
| 797,464 | 8/1905 | Sjastram | 182/232 |
| 3,688,455 | 9/1972 | Zebuhr | 52/115 |
| 4,062,156 | 12/1977 | Roth | 52/111 |
| 4,254,423 | 3/1981 | Reinhard | 52/118 X |
| 4,663,900 | 5/1987 | Rehm et al. | 52/118 X |
| 4,871,138 | 10/1989 | Sauter | 248/408 |
| 5,163,650 | 11/1992 | Adams et al. | 248/405 |

FOREIGN PATENT DOCUMENTS

| 671611 | 10/1963 | Canada | 248/405 |
|---|---|---|---|
| 2555820 | 5/1985 | France | 52/118 |
| 2575780 | 7/1986 | France | 52/118 |
| 1260800 | 2/1968 | Germany | 248/405 |
| 3434517 | 3/1986 | Germany | 53/118 |
| 3611810 | 8/1986 | Germany | 52/118 |
| 3636893 | 7/1987 | Germany | 52/118 |

*Primary Examiner*—Karen J. Chotkowski
*Attorney, Agent, or Firm*—William H. Drummond; Drummond & Duckworth

[57] ABSTRACT

A telescoping multi-sectional mast in which the upper sections are extended and retracted in a controlled predetermined sequence and in which each section, when fully extended, is automatically and positively locked to the next lower section.

The improved locking system includes a lock projection-lock engagement pair, one of the pair being carried on the outer surface of each of the upper sections of the mast and the other of the pair being carried on the upper ends of each of the intermediate sections. A lock actuator stud is carried on the upper end of each of the intermediate and bottom sections. This pair cooperates to operatively lock together in response to disengagement with the actuator stud carried on the next lower mast section, to restrain relative vertical movement between an upper section which is fully extended from the next lower section. The pair unlocks in response to engagement with the actuator stud carried by the next lower section.

An improved drive nut for an axial drive screw used in extending and retracting mast sections is located by a spring-loaded spline-seat within a nut housing, to absorb initial shock loads when initially engaged with the drive screw.

A cable tensioner/dispensing/stowage device provides an improved means for handling cables extending from ground level to equipment located on the top of the telescoping mast.

3 Claims, 11 Drawing Sheets

TELESCOPING MAST WITH IMPROVED HOLDDOWN-LOCKING MECHANISM

This invention relates to telescoping masts for radio antennas, flood lights and the like.

This Application is a continuation PCT International Application PCT/US92/08721 having an international filing date of Oct. 6, 1992, which is, in turn, a continuation-in-part of application Ser. No. 07/772,167, filed Oct. 7, 1991, now U.S. Pat. No. 5,163,650.

In another respect the invention pertains to portable telescoping masts which are specially adapted for quick and reliable operation under extreme environmental conditions.

In yet another respect the invention relates to such portable masts which can be extended, used and retracted with improved convenience and safety.

Telescoping masts have been widely employed for radio antennas, lights and a variety of other fixtures. Such masts have been operated by a variety of mechanism, including winches, hydraulic systems and the like. More recently, telescoping masts have been devised which use an axial screw mechanism for raising and lowering the mast sections. For example, an axial screw operated mast is disclosed in U.S. Pat. No. 4,062,156, issued Dec. 13, 1977 to Roth.

When telescoping masts are used under extreme environmental conditions and particularly in military or other portable operations, it is highly desirable that the masts be ruggedly constructed and be extremely fast, reliable and safe to operate. In such portable masts, it is particularly important that the sections be extended and retracted in sequence and that as each section is fully extended it is positively locked to the next lower section. In these ways the mast can be extended to the full desired height and the possibility of accidents and injuries due to one or more of the mast sections suddenly falling is minimized.

In recognition of these general problems, a complicated, spring-loaded mechanism has been proposed to perform these "holddown" and "locking" functions. Such a mechanism is disclosed in U.S. Pat. No. 4,871,138 issued Oct. 3, 1989 to Sauter.

Another complication, recognized by the Roth patent, is encountered when an axial drive screw system is used for raising and retracting a telescoping antenna. The nut-elements, carried by each mast section must sequentially engage and disengage the threads of the drive screw as the respective mast sections are raised. Since there will normally be some initial mismatch between the threads of the drive screw and the threads of the nut, shock loadings will temporarily be applied to the drive mechanism until the nuts properly engage the threads of the drive screw. Such shock loadings can damage the drive train components and can also damage or dislocate elements of a holddown-locking mechanism.

A further problem, associated with telescoping masts in general, is potential fouling of rf transmission lines and/or power and control cables which extend from ground-mounted equipment such as transceivers, antenna rotor controls, light switches, etc., when the telescoping tower is extended and retracted. In the past, such cables have been stowed on spring-tensioned rotatable drums or in gravity "baskets". However, the need still exists for a reliable, relatively uncomplicated cable stowage system which minimizes cable fouling and damage due to kinking, cutting, etc.

Accordingly, the principal object of the present invention is to provide an improved telescoping mast for radio antennas, flood lights and the like.

Another object of the invention is to provide such a mast which is portable and specially adapted for quick and reliable operation under extreme environmental conditions.

Yet another object is to provide such portable masts which can be extended, used and retracted with improved safety by reason on an improved holddown-locking mechanism which prevents premature extension of the mast sections and which positively locks the sections together as each section is fully extended.

Still another object of the invention is to provide such a telescoping mast in which shock loadings of an axial screw extension-retracting mechanism is minimized.

Yet another object of the invention is to provide an improved cable stowage system for telescoping masts which reduces the possibility of cable damage from kinking or cutting due to fouling of the cable during mast extension/retraction, which obviates the need for elements which introduce electrical discontinuities such as slip-rings, etc.

These, other and further objects and advantages of the invention will be apparent to those skilled in the art from the following detailed description thereof, taken in conjunction with the drawings, in which:

Briefly, in accordance with the invention, I provide a telescoping mast with an improved holddown-locking mechanism. Such telescoping mast include at least three nesting elongated tubular sections, i.e., a bottom section and upper sections which include a top section and at least one intermediate section. Means are provided for extending and retracting the upper sections in a predetermined sequence. Means are also provided for automatically locking adjacent sections together when fully extended in response to the extension/retraction of the upper section.

The improved holddown-locking mechanism includes a lock projection-lock engagement pair. One of the pair elements is carried on the outer surface of each of the upper sections of the mast, spaced from the lower end thereof. The other of the pair elements is carried on the upper ends of each of the intermediate mast sections. A lock actuator stud or finger is carried on the upper end of each of the intermediate and bottom sections.

The lock projection-lock engagement pair elements cooperate to operatively lock together in response to disengagement with the lock actuator stud carried by the next lower section, to restrain substantial relative vertical movement between an upper section which is fully extended from the next lower section and to operatively unlock from each other in response to engagement with the lock actuator stud carried by the next lower section.

According to a preferred embodiment of the invention, the extension/retraction of the upper sections is controlled by an axial drive screw. A power source is provided for rotating the drive screw which engages nuts carried internally of each of the upper mast sections. The nuts are sequentially engageable with the drive screw, to raise and lower the respective sections in response to rotation of the drive screw. An improved nut assembly includes a nut housing carried within each of the hollow mast sections, a nut within the housing and a spline-seat combination for locating the nut within the housing and permitting limited axial movement between the nut and the housing. A spring carried within the housing yieldably resists such axial movement.

In accordance with still another preferred embodiment, the screw drive assembly uses a multiple lead screw.

In accordance with yet another preferred embodiment of the invention, we provide a stowage, tensioning and dispensing assembly, especially adapted for use in handling the cable which extends between elements mounted at the top of the mast and ground level as the mast is extended and retracted. This assembly comprises and elongate frame, a pulley, spring means, carried by the frame—for urging the pulley toward an end of the frame and a cable, having a fixed end attached to one end of the frame, extending around the pulley and a free end extending away from the frame. The frame, pulley and spring cooperate to maintain the cable between the fixed and free ends thereof under tension corresponding to the force of the spring, dispense cable when the tension on the cable exceeds the force of the spring and retract cable when the tension on the free end of the cable is less than the force of the spring. As the cable is retracted, it is stored in the frame wound around and extending between the pulley and the frame.

Figure 1:
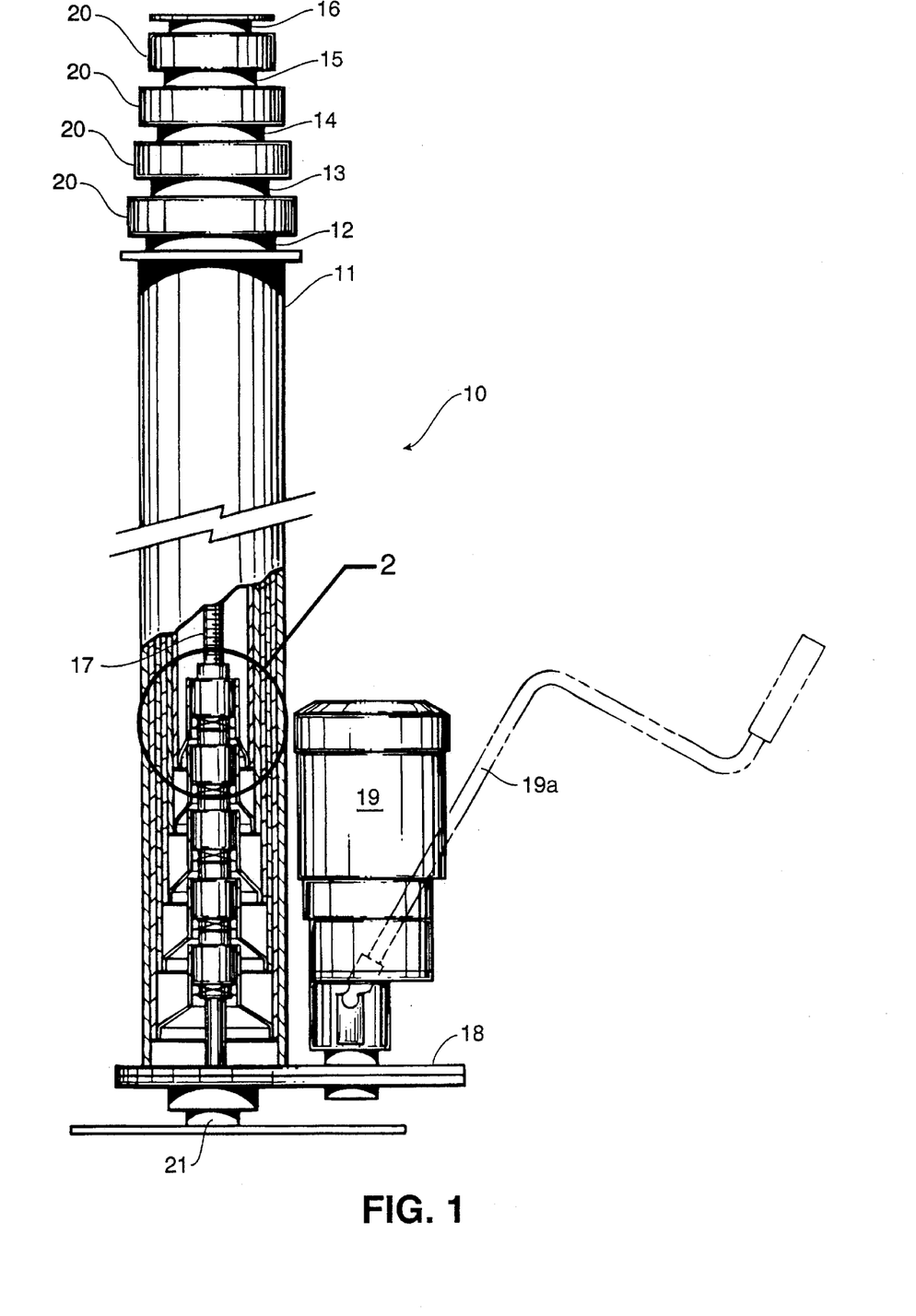
FIG. 1 is a side view of a telescoping mast assembly which is constructed in accordance with one embodiment of the invention, with all sections fully "nested"
Figure 3A:
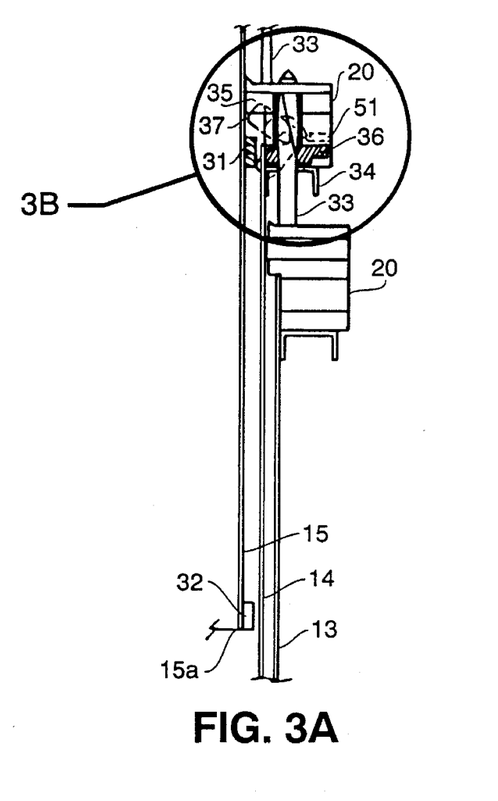
FIGS. 3a, 3b and 3c are, respectively, sectional, expanded sectional and plan views of a typical assembly of three nested sections of the mast of FIG. 1, showing details of the holddown-lockout mechanism just before the innermost section is fully extended.
Figure 3B:
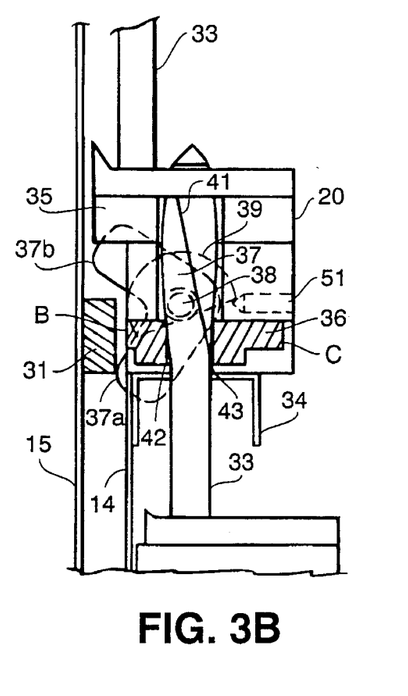
Figure 3C:
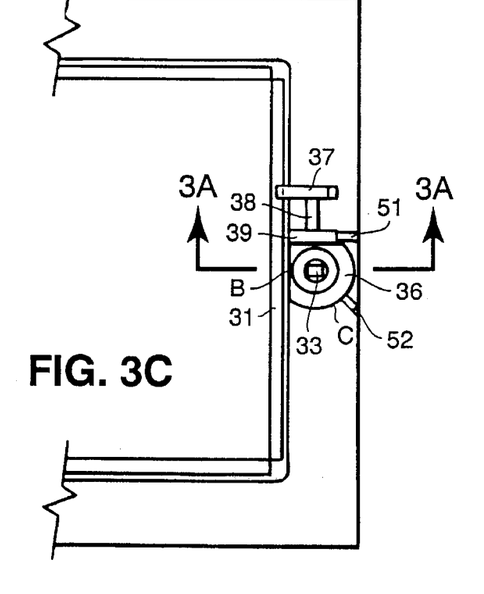
Figure 4A:
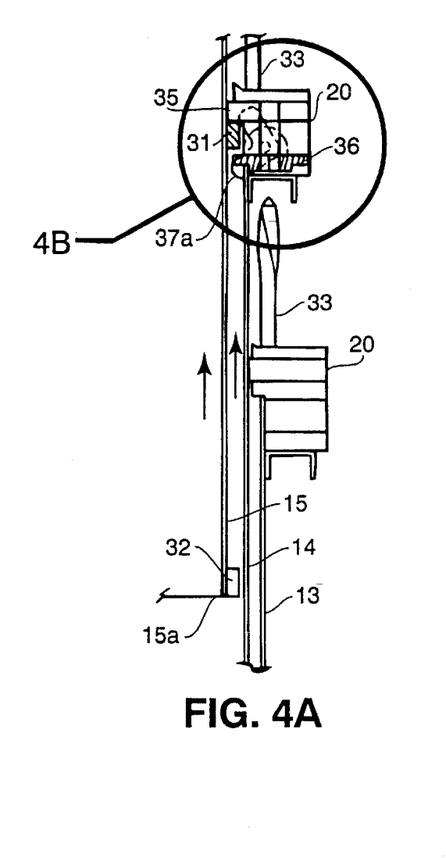
FIGS. 4a, 4b and 4c are similar views of the mast section of FIG. 3, with the inner mast section fully extended and the intermediate mast section partially extended.
Figure 4B:
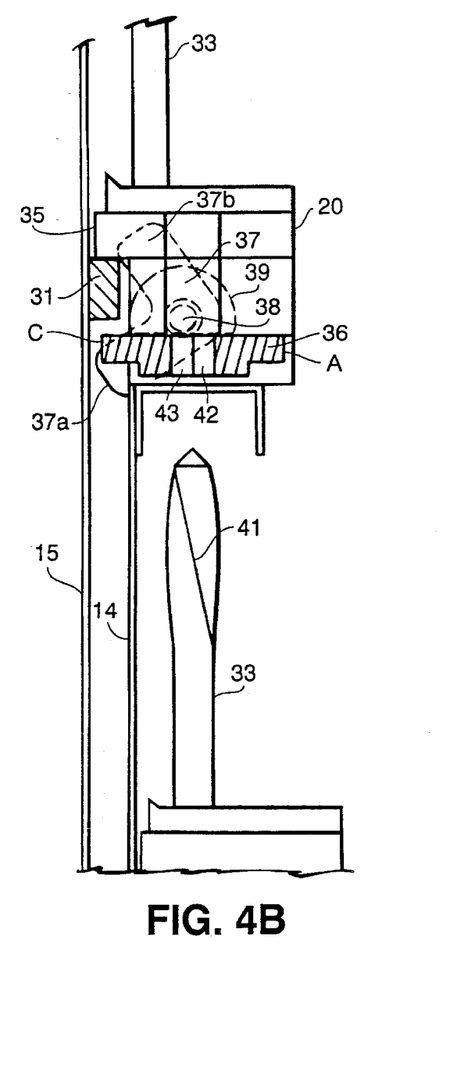
Figure 4C:
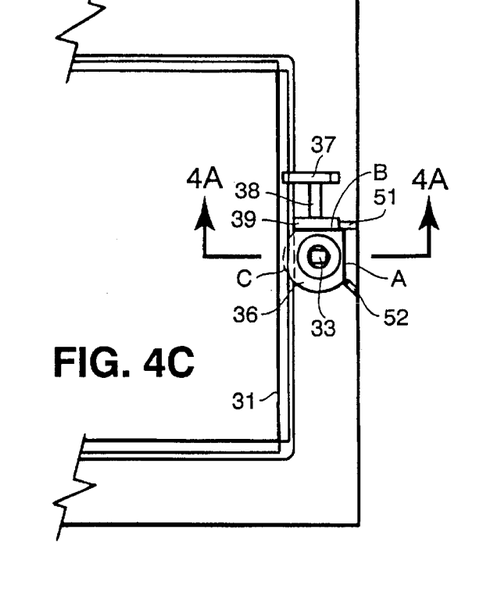
Figure 5A:
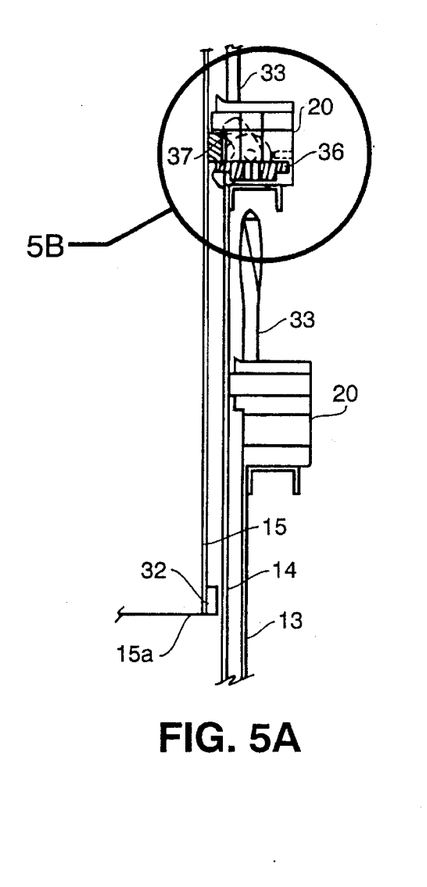
FIGS. 5a, 5b and 5c are similar views of the assembly of FIGS. 3 and 4 showing the inner mast section relaxes slightly downwardly after the inner mast section is fully raised and disengaged from the drive screw. Optionally spring loaded detents are depicted in FIG. 5 to maintain the components and the lock assembly in their respective proper operative position when the assembly is subjected to external shock, vibration, etc.
Figure 5B:
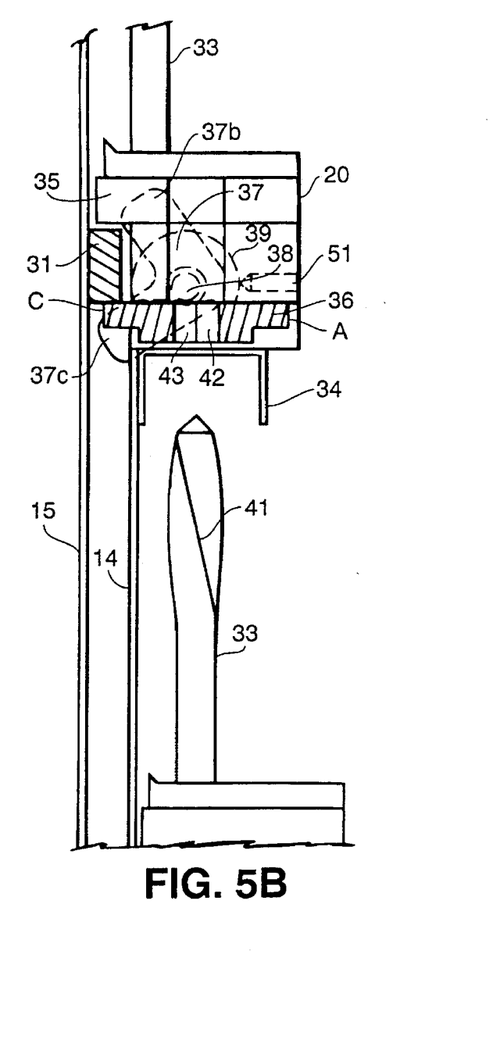
Figure 5C:
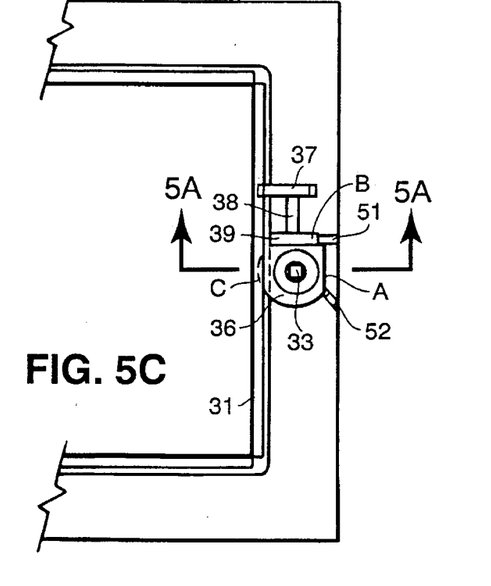

Turning now to the drawings in which like reference characters identify the same elements in several views, FIG. 1 depicts one embodiment comprising a telescoping mast assembly 10, consisting of a plurality of nested mast sections 11–16, which are extended and retracted by means of a drive screw 17, which is rotated by means of a gear train (not shown) enclosed within a gear box 18, powered by a drive motor 19, or alternatively, powered manually by a hand crank 19a. Lock assemblies 20, described more particularly below and in FIGS. 3–5, are carried on the upper ends of each of the nested intermediate mast sections 12–15, but are omitted from the upper ends of the bottom mast section 11 and the top section 16.

The mast assembly 10 and screw-drive components 18–19 are mounted on a suitable base assembly 21. The entire assembly 10–21 may be maintained in vertical position by suitable cable guys or by appropriate bracing (not shown).

Figure 2:
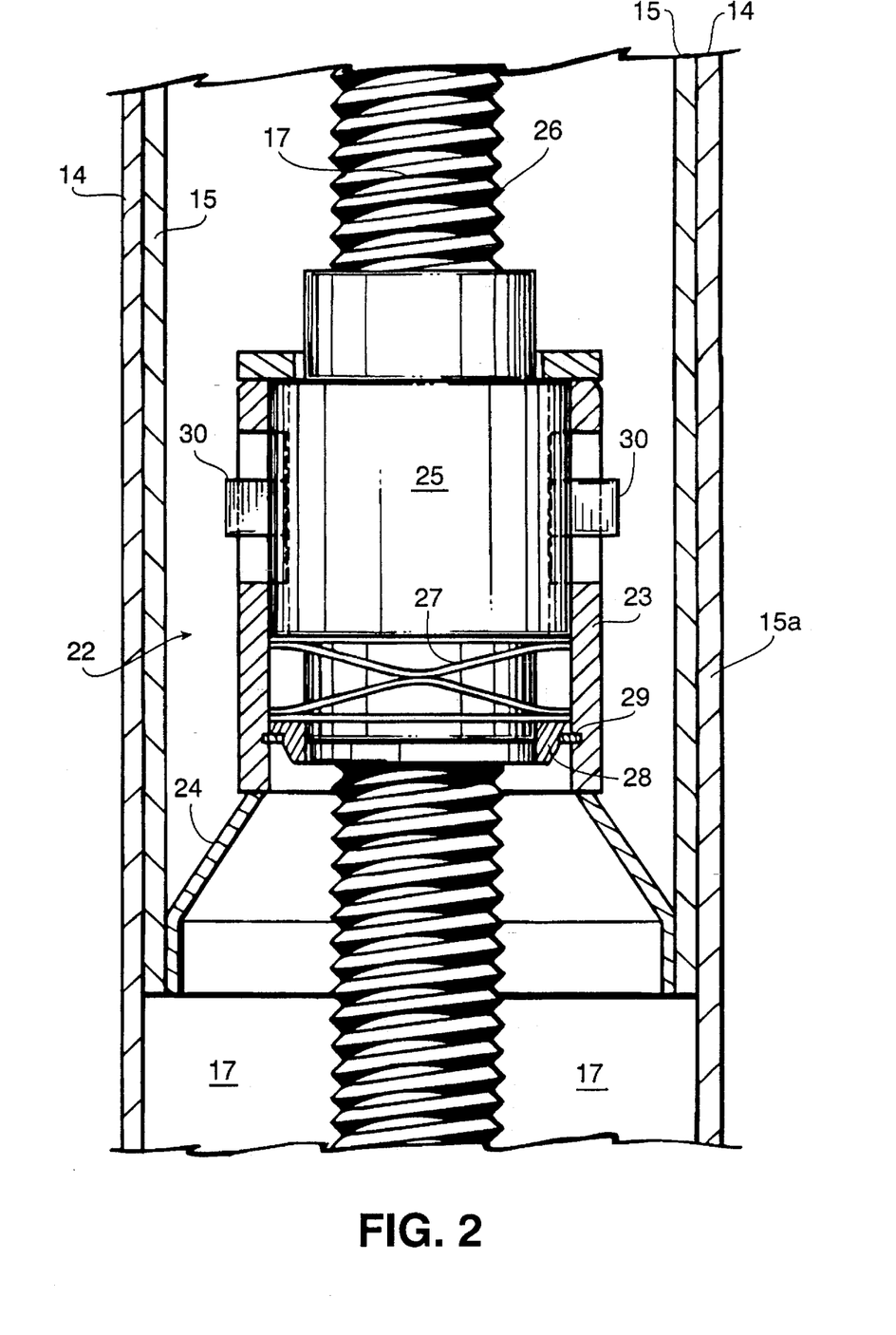
FIG. 2 is a sectional view of the drive nut assembly carried by each section of the mast of FIG. 1.

Referring more particularly to FIG. 2, each of the inner mast sections 12–16, e.g., 14 and 15, provided with a drive-nut assembly 22, fixed in the lower portion 15a of each mast section 15, etc. A housing 23 is supported by an upwardly-inwardly extending support 24. The hollow housing 23 receives a nut 25, the internal threads of which are shaped and dimensioned to engage external threads 26 formed on the upwardly extending drive screw 17. The nut 25 is urged upwardly in the housing 23 by an annular wave spring 27, which is supported within the nut housing 23 by a retaining washer—retaining ring assembly 28–29. Projections 30 extending in from the wall of the nut housing 23, restrain rotation of the nut 25 relative to the housing 23 while permitting limited axial movement of the nut 25 relative to the housing 23 against the force exerted by the wave spring 27. This limited axial movement permits the wave spring 27 to absorb axial loads which are temporarily imposed due to any initial mismatch between the internal threads of the nut 25 and the exterior threads of the drive screw 17 when the mast section 15 is initially raised causing engagement of these threads or lowered onto the threads during retraction.

In the presently preferred embodiment of the invention, multiple lead threads 26 are provided on the drive screw 17 and mating multiple lead internal threads are provided in the nut 25 to minimize the magnitude of such temporary axial loadings and to minimize the time during which such temporary loadings are applied to the structure.

The operation of the holddown-locking mechanism, which prevents premature extension of the mast sections and which positively locks the mast sections together as each section is fully extended or retracted, will now be described with particular reference to FIGS. 3, 4 and 5. This description depicts the relative movements of any 3 adjacent nested mast sections.

For purposes of illustration it will be assumed that FIGS. 3–5 depict the movements of mast sections 13, 14 and 15 of FIG. 1.

Referring to FIGS. 3a, b and c, the inner section 15 carries an outwardly projecting locking bar 31 on its outer surface, spaced upwardly from the lower end 15a thereof. A second outwardly projecting bar 32 is carried by the section 15 at its lower end 15a to reduce the tendency of the section 15 to wobble within section 14. Identical locking assemblies 20 are carried on the upper ends of each of the mast sections 13 and 14. A locking actuator stud 33 extends upwardly from the top of each of the lock assemblies 20.

Each lock assembly 20 is mounted on a channel support 34 and includes an inwardly projecting collar 35, a rotatable lock disk 36 and an L-shaped toggle 37, rotationally mounted on a transverse pin 38 journalled in the lock assembly block 20. A disk stop 39 is mounted on pin 38 for rotation in the vertical plane in response to rotation of the toggle 37.

The lock actuator stud 33 is provided with a cam surface 41 which matingly engages corresponding cam surfaces 42 formed internally of the central aperture 43 of the lock disk 36. The lock disk 36 is generally circular but is provided with two flat sides A and B. The circular peripheral segment of the disk 36 forms a locking projection C which, when the disk 36 is rotated as shown in FIGS. 4 and 5 extends inwardly under the lock bar 31 carried on the outer surface of the next inner section 15. In this condition the collar 35 of the lock assembly and the projecting segment C of the lock disk 36 cooperate to restrain substantial relative vertical movement of the lock bar 31 therebetween.

The operation of the holddown-locking mechanism is best understood by consideration of FIGS. 3, 4 and 5, which sequentially illustrate the movements of the various elements as the inner section 15 is raised so that the lock bar 31 approaches the lock assembly 20 of section 14 (FIG. 3), as section 15 is raised to achieve contact between the lock bar 31 and the collar 35 (FIG. 4) and as the drive-nut assembly of section 15 is lifted clear of the threads of the drive screw 17.

Referring to FIGS. 3a–3c, as the inner mast section 15 is raised relative to sections 14 and 13 (which are fully retracted), the lock bar 31 on the outer surface of mast section 15 moves past the lower leg 37a of the toggle 37. The stop 39 is in a position which prevents rotation of the lock disk 36 which, in turn, prevents mast section 14 and its lock assembly 20 from being lifted off the actuator stud 33, attached to the lock assembly 20 of section 13, thus preventing relative vertical movement between mast sections 13 and 14.

Referring to FIGS. 4a–4c, continued raising of the inner mast section 15 (by engagement of its nut assembly 25 with the raising screw 17) causes the lock bar 31 to engage the undersurface of the collar 35. Meanwhile, the lock bar 31 contacts the upper leg 37b of the toggle 37, causing the toggle 37, the shaft 38 and the stop 39 to rotate clockwise. The rotation of the stop 39 to the position shown allows the locking disk 36 to rotate (by engagement of the cam surfaces 41–42) which, in turn, permits locking assembly 20 and mast section 14 to be lifted clear of the actuator stud 33 on section 13. Such rotation of the lock disk 36 causes the peripheral segment C to project inwardly beneath the lock bar 31.

Referring to FIGS. 5a–5c, when the raising nut 25 associated with mast section 15 reaches the ends of the threads 26 on the raising screw 17, and these threads have been fully disengaged, continued upward deployment of mast section 15 is effected by contact between the inwardly projecting segment C of the lock disk of section 14 exerting force on the lower surface of lock bar 31 on section 15. Thus, the lock bar 31 is constrained for limited vertical movement between the lock segment C and the collar 35.

Each succeeding lower section of the nested mast sections is then selectively raised to its full vertical height relative to the next lower section and is positively prevented from further upward or downward relative movement. As will be apparent to those skilled in the art, retraction of the telescoping assembly is sequentially and positively accomplished by a reversal of the steps shown in FIGS. 3–5. As will be observed, during extension, while fully extended and during retraction of the telescoping assembly, none of the mast sections are retained or restrained from relative movement by spring-loaded mechanisms. Spring-loaded detents 51 and 52 are provided, however, to restrain accidental rotation of the stop 39 and the lock disk 36 when the sections are fully nested (as shown in FIG. 1) so that they remain fully nested during transportation, when the components may be subjected to road vibrations, etc.

The presently preferred embodiment of the invention is depicted in FIGS. 6–9, in which like reference characters identify the same elements.

The preferred embodiment of the invention is depicted for purposes of illustration as a mast assembly 61 consisting, for example, of five nested cylindrical sections, 62–66, formed, for example, of extruded 6061-T6 aluminum, a suitable drive assembly, similar to that depicted in FIGS. 1–2, is provided at the base of the mast assembly 61 to transmit torque to a drive screw (not shown) that extends upwardly to a point slightly above the top of bottom section 62. The drive screw engages nuts located at the bottoms of sections 63–66, sequentially, as each succeeding section is raised or lowered. When each of the sections 63–66 reaches full extension, it is automatically locked to the section below it by a locking mechanism 67. At the same time, in the manner depicted in the embodiment of FIGS. 1–5, the drive screw engages the drive nut of the next lower section. Each locking mechanism 67 performs a hold-down function (explained in more detail in FIGS. 8–9) that locks the remaining "nested" section together and prevents premature extension of the mast sections 63–66 out of sequence. This procedure continues until all sections are fully extended.

Lowering or retracting the mast is the reverse of deployment. As the drive screw turns in the opposite direction, the locking mechanisms 67 automatically disengage sequentially as retraction continues. Each section is automatically located to the nested cluster below it as it reaches the end of its downward movement.

Figure 6:
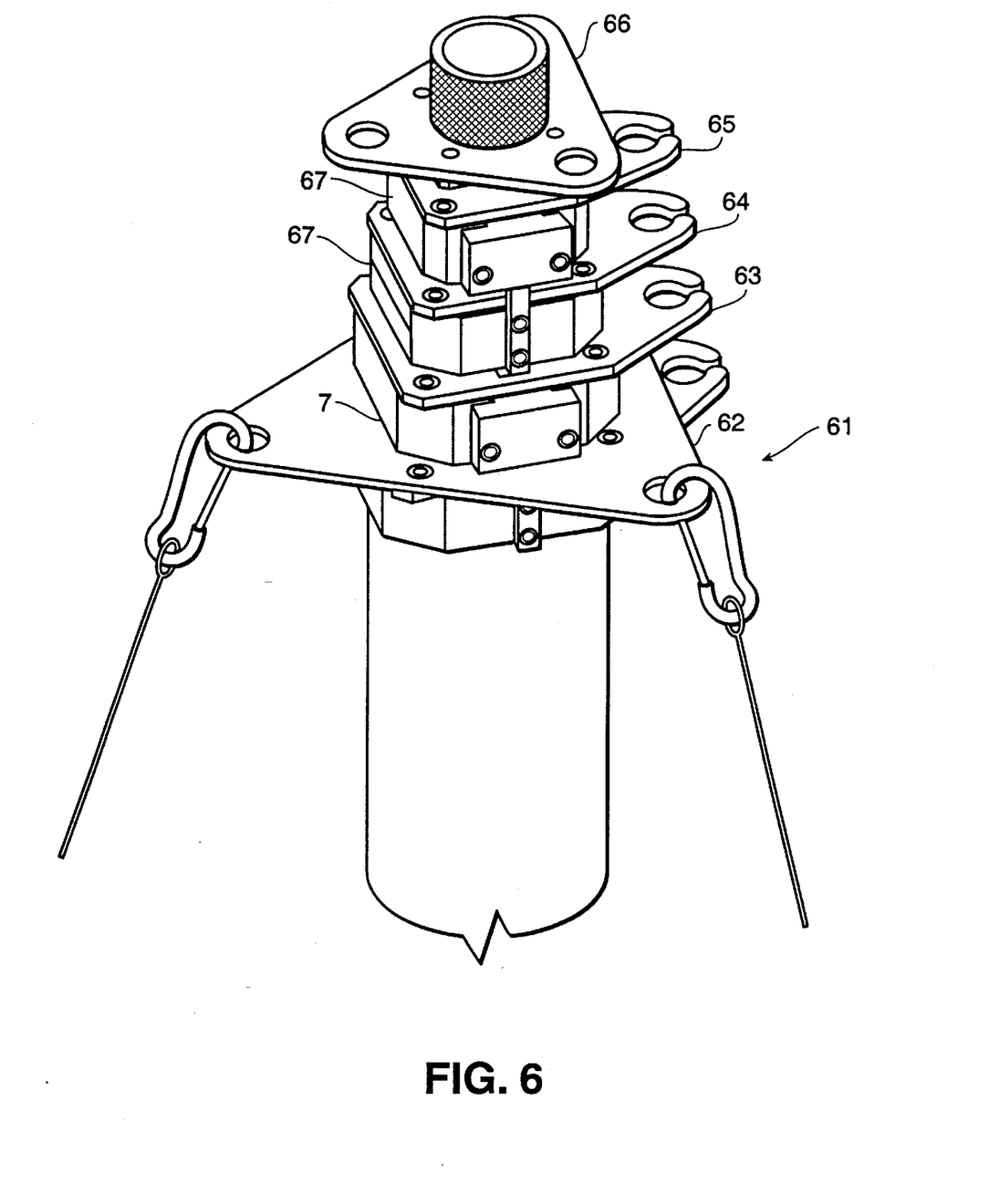
FIG. 6 is a perspective view of a telescoping mast assembly constructed in accordance with another and preferred embodiment of the invention, with all sections fully "nested"
Figure 7:
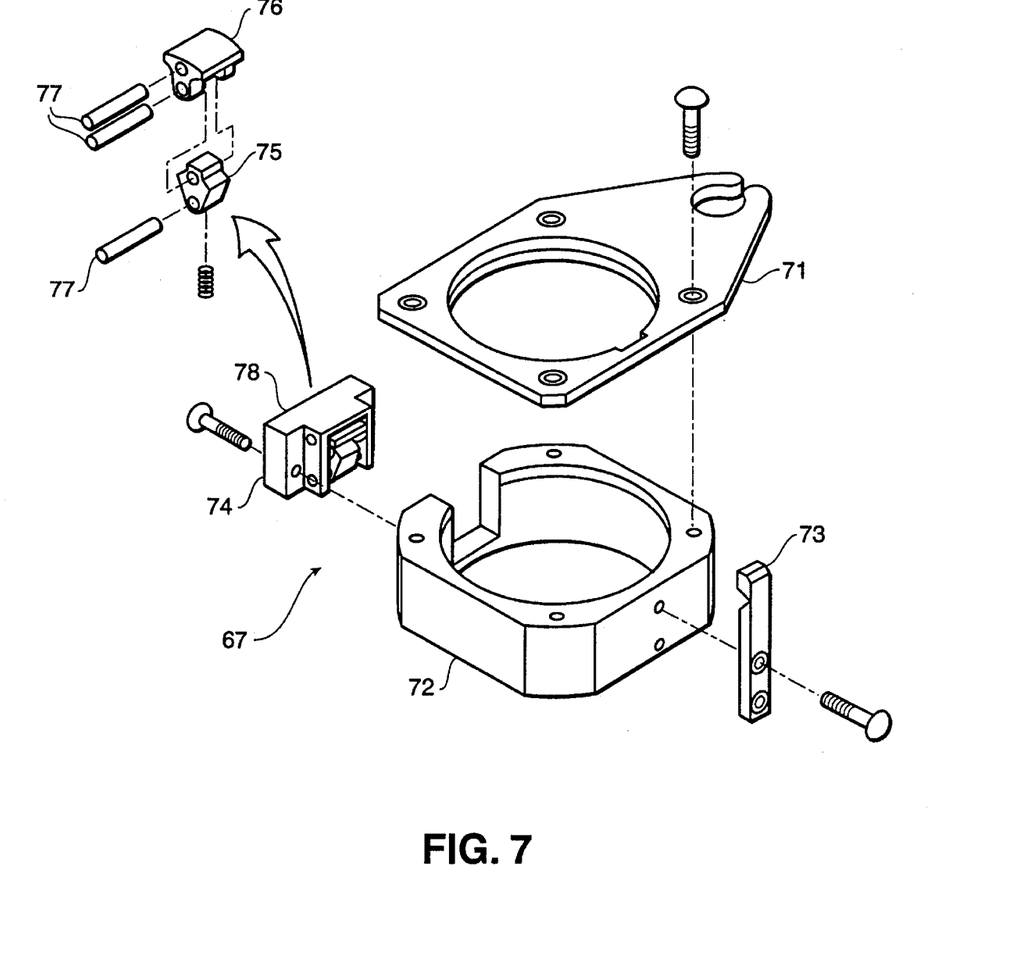
FIG. 7 is an exploded view of the components of the locking assembly of the mast of FIG. 6.

Each of the locking mechanisms 67 are identical and consist of a flange 71, a slide member 72, an actuator post or stud 73 and a toggle assembly 74 which includes a lock member 75 and a rocker member 76, mounted for rotation on pivot pins 77 in a toggle block 78.

Figure 8A:
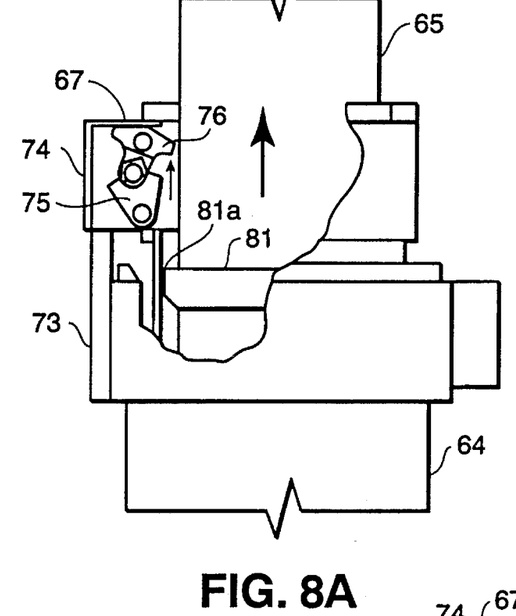
FIGS. 8A and 8B are partially cut-away views of typical adjoining sections of the mast of FIG. 6, showing the assembly and cooperative relationships of the locking assembly elements FIG. 7 and the actuator stud or finger located on the next lower section, when the mast of FIG. 6 is being extended.
Figure 8B:
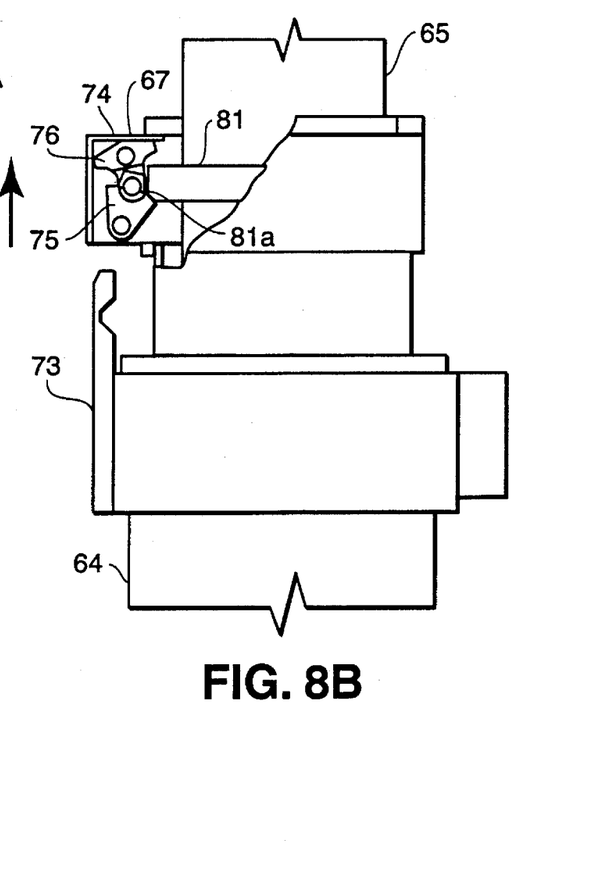
Figure 9A:
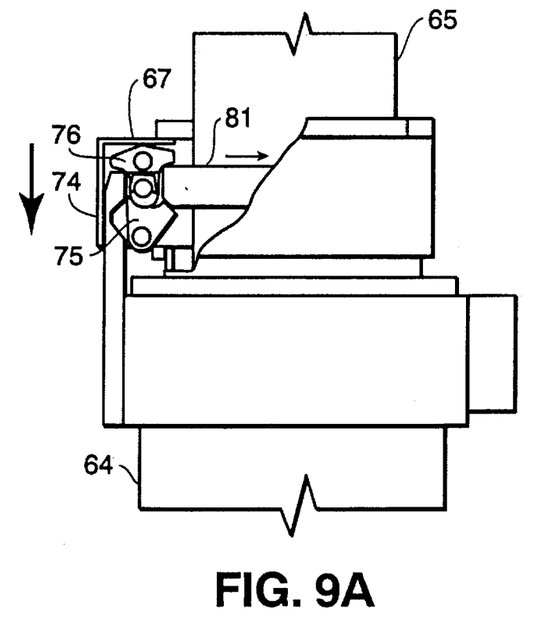
FIGS. 9A and 9B are partially cut-away views of the sections of FIGS. 8A and 8B, showing the cooperative relationships of the locking assembly and actuator stud, when the mast of FIG. 6 is being retracted.
Figure 9B:
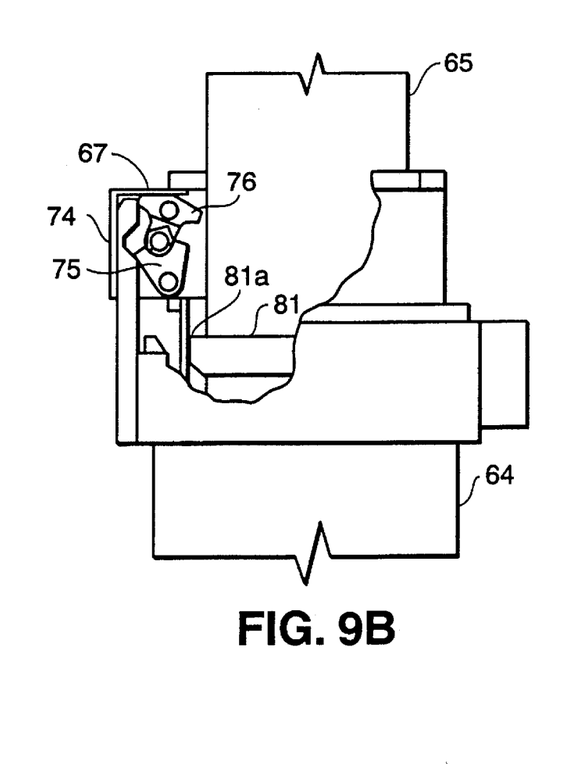

Referring more particularly to FIGS. 8–9, a lock projection ring or collar 81 is carried on the bottom of each of the nesting tube sections 63–66, a peripheral edge 81a of which extends radially outwardly to a point within the toggle assembly 74 of the next upper section (shown more clearly in FIGS. 8b and 9a).

The action of the lock assembly of FIGS. 6–7 is illustrated in FIGS. 8–9. FIGS. 8a–8b illustrate the action of the lock assembly during mast extension and FIGS. 9a–9b illustrate the action of the lock assembly during mast retraction.

As mast extension begins, the lock projection collar 81 of the rising section 65 approaches the lock 67 on the top of the next lower section 64. As the rising section 65 reaches full extension, the shoulder 81a of lock projection ring 81 engages the hinged rocker member 76, causing the lock member 75 to toggle inward toward the mast section 65. The lock member 75 disengages from the actuator post or stud 73, locking sections 65 and 64 together to prevent substantial relative vertical movement.

This action continues until all sections are fully extended and locked together.

During retraction, the lock member 75 remains displaced inwardly toward the mast section 65 until the actuator stud 73 extending upwardly from the lower section 63 contacts rocker member 76, causing the lock member 75 to toggle outward from the mast section 65 allowing the upper section 65 to descend within next lower section 64.

As will be observed, both of the sections involved in a locking or unlocking action are supported by the drive screw at all times, which prevents mast tube slippage and provides positive control of the mast section at all times.

Figure 10:
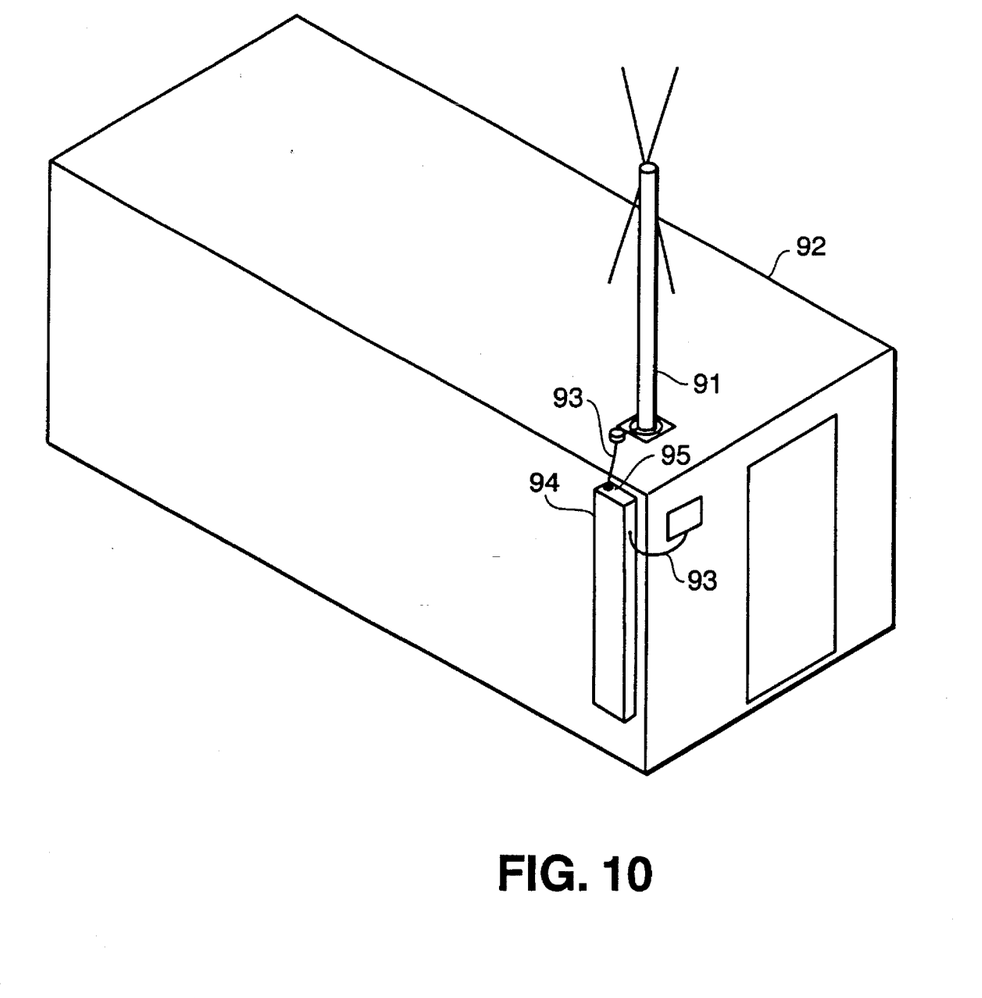
FIG. 10 is a perspective view of a typical installation of an telescoping antenna mast embodying the invention in a portable building with cable tensioning/dispensing/stowage apparatus for conveniently and safely handling the cables which extend from the mast mounted elements to ground level.
Figure 11:
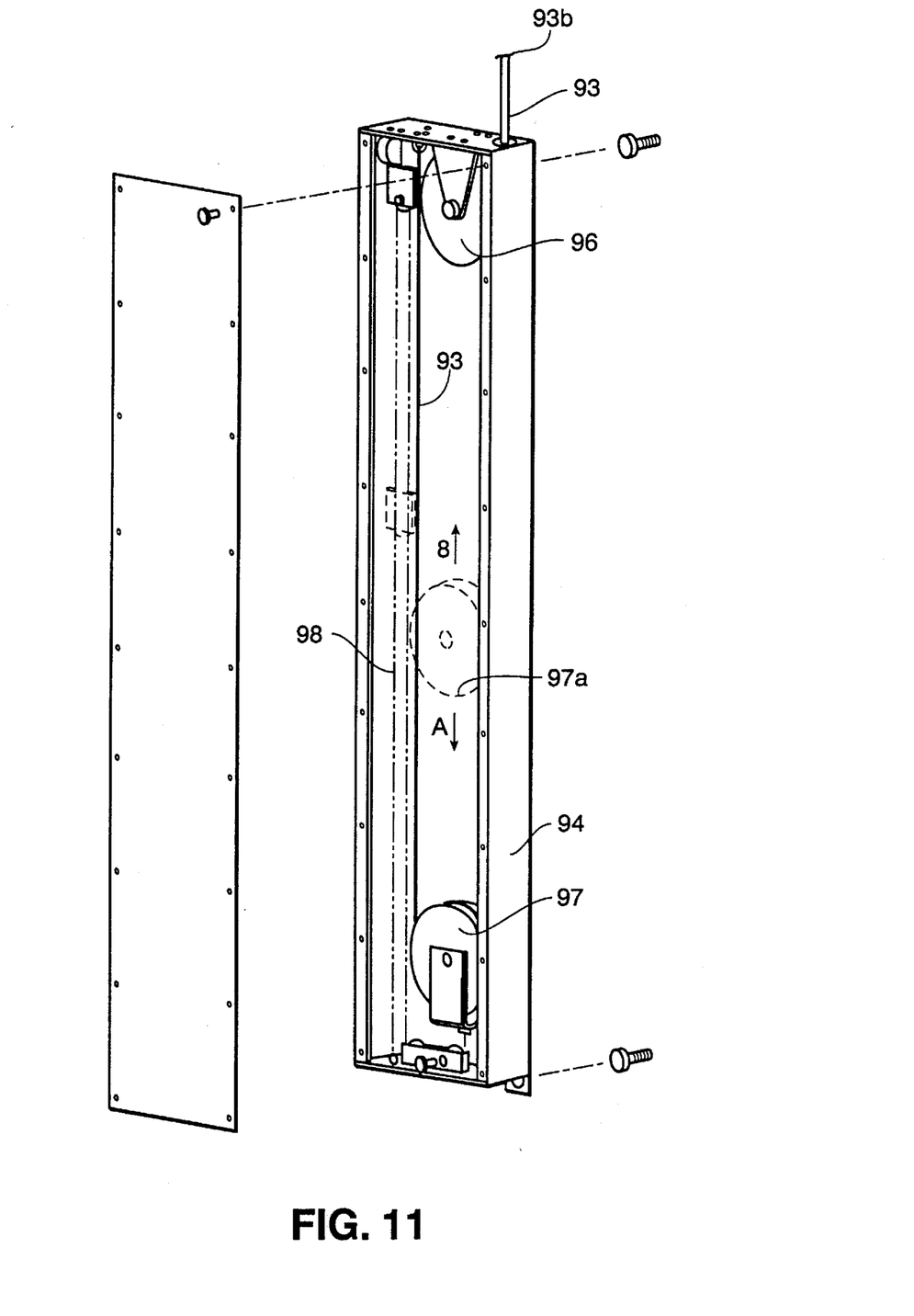
FIG. 11 is a perspective view of one of the cable tensioning/dispensing/stowage assemblies of FIG. 10.

FIGS. 10–11 illustrate a cable stowage/dispensing assembly which is conveniently embodied in convention with the masts of FIGS. 1–9. As shown in FIG. 10, the mast 91 assembly is mounted to extend upwardly from within a temporary building 92. A cable 93, e.g., a coaxial rf transmission cable extends from within the building 92 into a housing 94 mounted on the outside of the building 92. The cable 93 extends upwardly through cable stand-offs 95 to the top of the mast 91. The housing 94 forms an elongate frame which contains one or more pulley assemblies 96 and 97, which may have multiple sheaves. A portion 93*a* of the cable 93 is attached and affixed to the frame 94. The cable 93 extends around pulley 97 and over the pulley 96 one or more times and the free end 93*b* exits the housing frame 94. A spring 98 urges pulley 97 downwardly in the direction of the arrow A. The frame 94 pulleys 96–97 and spring 98 cooperate to maintain the cable 93 between the fixed end 93*a* and the free end 93*b* under tension which corresponds to the force of the spring 98. When the mast 91 is extended, the tension on the cable 93 exits the force of the spring 98, causing pulley 97 to be displaced upwardly in the direction of the arrow B, as indicated by the dashed lines 97*a*, dispensing cable as required when the mast is extended. When the mast 91 is retracted, relieving tension on the cable 93*b*, the spring 98 causes the pulley 97 to be retracted in the direction of the arrow A, retracting the cable 93 into the housing frame 94 for storage.

The upper section of a telescoping mast assembly such as depicted in FIGS. 1 or 6 can be fabricated of suitable non-conductive plastic material and rf radiating elements can be embedded in the plastic or suspended in the interior of the section, such that the top section itself becomes a rf radiating or receiving antenna.

Having described our invention in such terms as to enable those skilled in the art to understand and practice it and having identified and disclosed the presently preferred modes and embodiments thereof, we claim:

1. In a telescoping mast, including
   at least three nesting elongate tubular sections having upper and lower ends,
      a bottom section, and
      upper sections, including
         a top section, and
         at least one intermediate section,
   means for extending and retracting said upper sections in a predetermined sequence,
   and
   means responsive to extending and retracting said upper sections for automatically locking adjacent sections together when fully extended, the improved holddown-locking means comprising:

(A) a lock projection-lock engagement pair, one of said pair being carried on the outer surface of each of said upper sections, spaced from the lower end thereof, and the other of said pair being carried on the upper ends of each of said intermediate sections;

(B) a lock actuator stud carried on the upper end of each of said intermediate and bottom sections;

each said pair cooperating to
      operatively lock together in response to disengagement with the lock actuator stud carried by the next lower section, to restrain substantial relative vertical movement between an upper section which is fully extended from its next lower section, and
      operatively unlock from each other in response to engagement with said lock actuator stud carried by the next lower section.

2. In a telescoping mast of claim 1, wherein the means for extending and retracting said upper sections include
   an axial drive screw;
   means for rotating said drive screw; and
   nut means carried internally of each of said upper sections, engageable with said axial drive screw to raise and lower said sections in response to rotation thereof,
the improved nut means comprising:

(A) a nut housing carried within each of said hollow mast sections;

(B) a nut within said housing;

(C) spline-seat means for locating said nut within said housing and permitting limited axial movement therebetween; and (D) spring means carried within said housing for yieldably resisting said axial movement.

3. In the telescoping mast of claim 2, the improvement comprising a multiple lead axial screw.

* * * * *